(12) United States Patent
Moore, III et al.

(10) Patent No.: US 7,665,685 B2
(45) Date of Patent: Feb. 23, 2010

(54) MODULAR CAROUSEL ASSEMBLY AND METHOD

(75) Inventors: Marbert G. Moore, III, Katy, TX (US); Thomas E. Gaffney, Sheboygan, WI (US)

(73) Assignee: DeepFlex, Inc., Houston, TX (US)

( * ) Notice: Subject to any disclaimer, the term of this patent is extended or adjusted under 35 U.S.C. 154(b) by 96 days.

(21) Appl. No.: 12/104,555

(22) Filed: Apr. 17, 2008

(65) Prior Publication Data
US 2009/0261210 A1    Oct. 22, 2009

(51) Int. Cl.
*B65H 75/20* (2006.01)
(52) U.S. Cl. .................. 242/390.2; 242/393; 242/398; 242/407; 138/106; 248/346.01; 52/65
(58) Field of Classification Search ............... 242/390.2, 242/393, 398, 407, 564, 564.5, 362, 595, 242/595.1, 597.6, 486.8, 539, 541, 541.3, 242/577, 577.1, 577.2, 577.3, 577.4, 607, 242/607.1, 607.2, 604, 604.1, 128, 129; 137/355.16, 355.18, 355.19, 355.2–355.23, 137/355.26, 355.27; 138/106; 248/346.01, 248/346.03, 346.3; 52/65, 7
See application file for complete search history.

(56) References Cited

U.S. PATENT DOCUMENTS

| | | | |
|---|---|---|---|
| 1,819,656 A | 8/1931 | Pressley |
| 2,262,900 A | 11/1941 | Morgan |
| 2,959,279 A | 11/1960 | Kraft et al. |
| 2,964,144 A | 12/1960 | Wheeler |
| 3,491,496 A | 1/1970 | Johnston |
| 3,599,502 A | 8/1971 | Craft et al. |
| 3,804,111 A | 4/1974 | Chatard et al. |
| 3,941,146 A | 3/1976 | Chatard et al. |
| 3,965,713 A | 6/1976 | Horton |
| 3,968,961 A | 7/1976 | Mancusi, Jr. |
| 3,975,969 A | 8/1976 | Osborn et al. |
| 4,018,095 A | 4/1977 | Shimano |
| 4,306,682 A | 12/1981 | Toussaint et al. |

(Continued)

*Primary Examiner*—John Q Nguyen
*Assistant Examiner*—William E Dondero
(74) *Attorney, Agent, or Firm*—Osha • Liang LLP

(57) ABSTRACT

A modular rotating carousel assembly for storage and unspooling of pipe or cable is provided that comprises a plurality of triangular subassemblies; each triangular subassembly comprises a base member and at least one pair of connecting members; the connecting members are connected together at one end to form an apex and are connected at the other end to the base member; the base members of the plurality of triangular subassemblies are rotatably connected together to form a first circle; wherein the apexes of the connecting members extend outwardly from said first circle; and a plurality of rotating caster members is positioned beneath the rotatable connection of a plurality of said base members. Additional sets of triangular subassemblies are built up on concentric circles until the desired size of carousel is formed. A drive mechanism is provided that includes a motor that rotates a perimeter drive chain that engages sprocket pads spaced about the circumference of the carousel. A modular hub is provided that includes a set of fixed plates arranged in a circle and a set of adjustable plates that are connected to the fixed plates. A set of segments forming a uniform circular shape is attached to the outside surface of the moveable plates and vertically oriented curved plates are positioned about the outer surface of the set of segments to provide a uniform surface for casters to rotate about.

19 Claims, 16 Drawing Sheets

U.S. PATENT DOCUMENTS

| | | |
|---|---|---|
| 4,481,005 A | 11/1984 | Mann, Jr. |
| 5,860,333 A | 1/1999 | Feng et al. |
| 6,213,905 B1 | 4/2001 | White et al. |
| 6,328,172 B2 | 12/2001 | Alneng et al. |
| 6,446,663 B2 * | 9/2002 | Francis .................. 137/355.17 |
| 6,491,779 B1 | 12/2002 | Bryant |
| 6,516,892 B2 | 2/2003 | Reilly |
| 6,745,699 B2 | 6/2004 | Hill et al. |
| 2003/0145760 A1 | 8/2003 | Hadley |

* cited by examiner

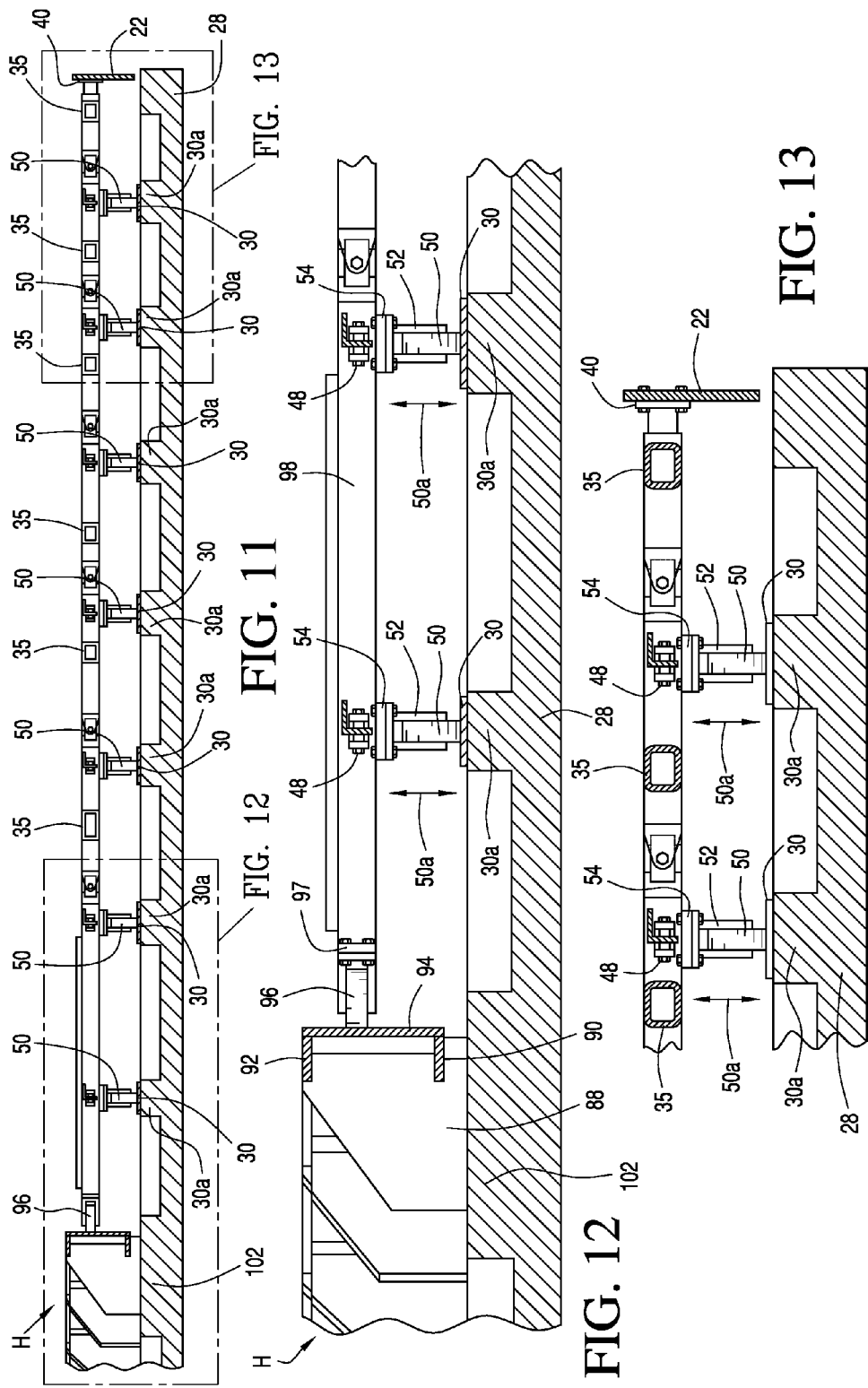

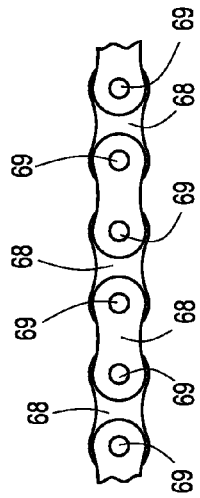
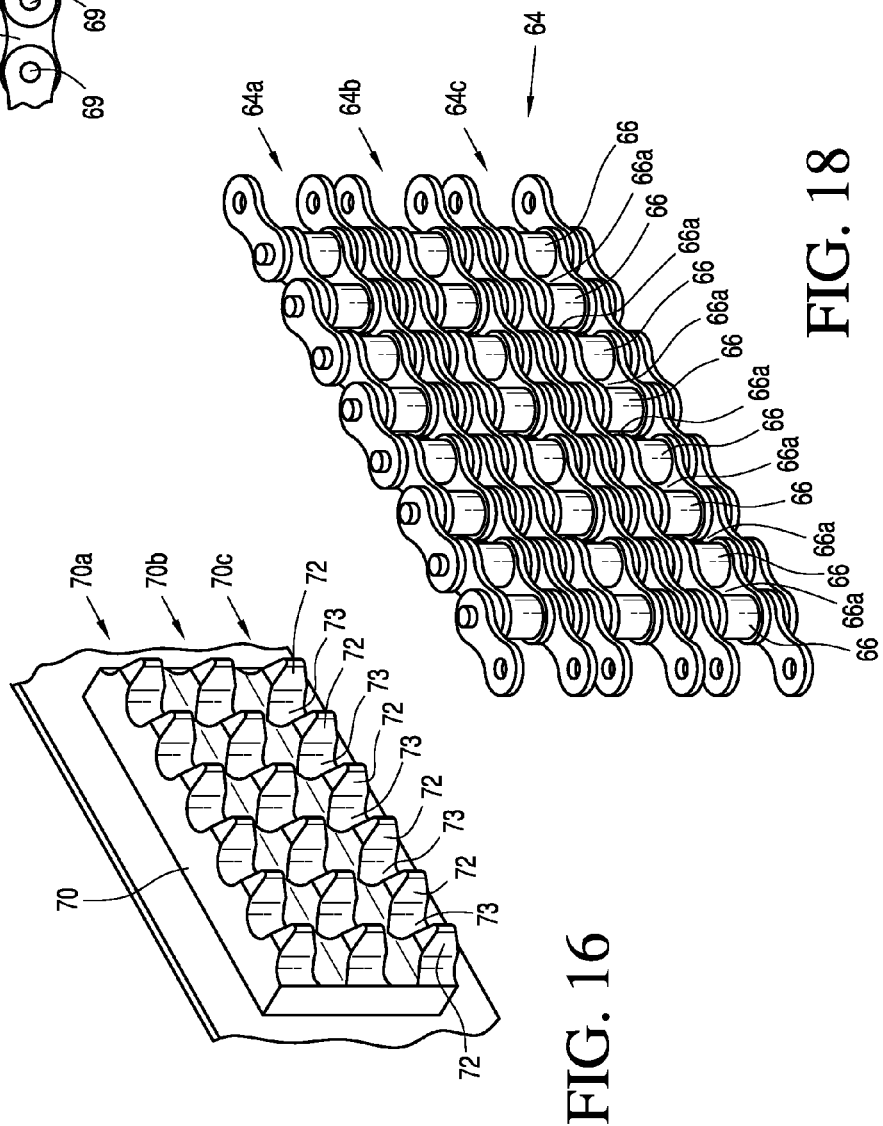
FIG. 17
FIG. 18
FIG. 16

MODULAR CAROUSEL ASSEMBLY AND METHOD

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The field of the invention is pipe storage devices and in particular, pipe storage devices that rotate pipe or cable about a vertical axis.

2. Description of the Related Art

In the oil and gas industry, flexible and semi-flexible tubular goods and cables are stored and transported on spools or carousels. The rotating axes of spools are oriented either horizontally or vertically while the rotating axes of carousels are oriented vertically.

Carousels have been used for many different purposes over the years. For example, U.S. Pat. No. 1,819,656 shows the use of a carousel to revolve a stage. U.S. Pat. No. 3,968,961 shows a merry-go-round carousel. U.S. Pat. No. 2,964,144 and US Patent Publication 2003/0145760 show carousels used for rotatable aircraft storage hangars. U.S. Pat. No. 6,745,699 shows a carousel used to rotate production parts on a production line. The subject of this invention relates to carousels used to store and unspool pipe or cable, as would be typically in the oil and gas industry.

Most carousels rotate on uneven surfaces because it is not generally possible or practical to provide a truly flat surface. The flatness can vary from approximately +/−0.10 inch to +/−3 inches or more and the possible variation in surface flatness increases as the size of the carousel increases. The carousel of this invention may be either in a fixed location, such as in a manufacturing building or it may be on the deck or inside of a marine vessel. If a carousel is built and installed in a building, it would typically rotate on a concrete based, or other hard surface, which generally could be level to within +/−0.25 inch, but possibly as much variation as +/−0.5 inch, or more. For applications involving mounting a carousel on a marine vessel, the variation in support surface flatness can be significant. Moreover, a deck of a vessel, from which pipes or cables are deployed offshore, can be curved or can flex with the variable forces that are encountered in the offshore environment. Marine vessels typically have flexibility designed in, to prevent stress damage from the changing and considerable ocean forces.

U.S. Pat. Nos. 3,804,111 and 3,941,146 show the use of a carousel for purposes of storing drill pipe. Both U.S. Pat. Nos. 3,804,111 and 3,941,146 also show the vertical displacement of wedge shaped sectors to raise the entire carousel sector in response to an uneven support surface. U.S. Pat. No. 3,965,713 shows the use of a carousel to store and unspool pipe during offshore pipe lay operations in preparation for oil or gas production.

There can be substantial lengths and weights of tubular goods that are coiled onto the drill pipe and offshore pipe carousels. As the lengths and loads increase, the support structure of the carousel can become extremely important. As the lengths of the pipe to be stored increases, the overall diameter of the carousel must also increase. As the diameter of the carousel increases, it becomes probable that the underlying support surface, which supports the carousel mechanism and the weight of the pipe on the carousel, will be uneven and will not be perfectly flat. Carousels are typically supported by casters that rotate about circular rails. If the underlying support is uneven, the casters can rise up and lose contact with the supporting circular rails. If that happens, the load is transferred to an adjacent caster or a caster that is in contact with the rails. Because of the extreme loads that are carried by the carousel, the concentrated loads placed on those casters that are in contact with the rail can exceed the capacity of the casters, which can cause the load bearing casters to fail. The problem can then become aggravated because if one or more casters fail, the pipe weight can then immediately and catastrophically be transferred to other casters that are in contact with the rails. The failure cascades by then causing the remaining casters to be exposed to the load that is no longer supported by the failed casters.

It may also be desirable to move flexible pipe from the manufacturing location to a pipe lay vessel, from which the flexible pipe may then be installed into the subsea water column. The decks of barges and work vessels are somewhat flexible by design, to respond to wave and hydrodynamic forces that are imposed on them when they are operating in the oceans, seas and the challenging offshore environment. The flexing causes the underlying support to become uneven, which can again cause the problem of all casters not being in contact with the circular rails.

Additional problems can occur when extremely large diameter carousels are constructed. Because of the extreme transverse loads that occur when the carousel is rotated during the spooling or unspooling of pipe, it is not practical to use a conventional center "kingpin". The transverse loads that are placed on the center kingpin would require that the kingpin be extremely large. Furthermore, the radius of the center hub must be no less than the minimum bend radius of the flexible pipe that is wound about the center of the carousel.

The large diameter necessary to accommodate long lengths of relatively large diameter pipe also creates challenges related to the mechanism that is used to rotate the carousel. Motors may be attached to individual casters, as shown in U.S. Pat. Nos. 3,804,111 and 3,941,146. As the number of casters increases, and the size and weight of the carousel increases, the number of individual motors can become unwieldy and unreasonably expensive. Gears may be attached about the circumference of the carousel, with a motor engaged with the track, as shown in U.S. Pat. No. 3,965,713. This requires a very large, heavy and expensive gear to be used. A motor, attached to a rotating gear, may also be used to engage a chain that encircles the entire carousel, as shown in U.S. Pat. No. 6,745,699. Unfortunately, when a chain encircles the entire carousel, it becomes extremely heavy and expensive, and if the weight of the chain sags it can cause serious operational problems.

BRIEF SUMMARY OF THE INVENTION

A modular rotating carousel assembly and method of constructing the assembly for storage and unspooling of pipe or cable is provided that optionally includes a plurality of concentric support rings. A plurality of triangular subassemblies comprise a base member and at least one pair of connecting members. The base members are oriented substantially tangentially to the support ring above which they are positioned. Each of the connecting members is connected at one end to the base member and connected at the other end to the other connecting member to form an apex. The apex is oriented outwardly from the center of the concentric support rings. The triangular subassemblies are rotatably interconnected at the base members about the circumference of the support rings whereby the base members form an articulating substantially circular ring above each support ring above which each base member is positioned.

The base members of the plurality of triangular subassemblies may also simply be rotatably connected together to form a first circle; wherein the apexes of the connecting members extend outwardly from first circle; and then positioning a plurality of rotating caster members beneath the rotatable connections of the plurality of base members. Concentric support rings may be used to support the caster members if desired, but they are optional.

The base members of additional triangular subassemblies are rotatably interconnected to the apexes of the connecting members of existing triangular subassemblies whereby the interconnected base members form an additional articulating substantially circular ring above the support ring above which each base member is positioned.

Tangential support members are rotatably connected between each apex of the triangular subassemblies. The tangential support members are positioned substantially tangential to the support ring above which each tangential support member is positioned; whereby the tangential support members provide movement in the vertical direction and provide lateral support to the triangular subassemblies.

Rotating casters are positioned below the triangular subassemblies at each of the three outer points of each triangular subassembly to support the triangular subassemblies and to allow the triangular subassemblies and the carousel to rotate about the plurality of concentric support rings.

The resulting articulating assembly provides numerous advantages. The multiple, articulating joints, each of which typically includes a supporting caster, results in an assembly that can fully support the load of pipe that is on the carousel by keeping the rotating casters on the surface of the concentric support rings. There is articulating movement in multiple directions. First, the interconnected base members of the triangular subassemblies form an articulating substantially circular ring above the support rings above which the interconnected base members are positioned. Second, the moveable interconnection between the base members and the apexes of the triangular subassemblies allows vertical movement between adjacent sets of triangular subassemblies. The multiple ranges of motion is similar in nature to the kinematics of the motion of a manta ray, whereby the vertical motions are not limited to movements at points positioned at varying positions away from center, but also includes vertical movements at points along concentric circular paths. Such an improved range of motion for the carousel assembly improves the characteristics of the carousel by maximizing the number of supporting casters that remain in contact with the underlying support structure to thereby support the load on the carousel and prevent premature failure of one or multiple rotating casters.

The modular construction of the inventive rotating carousel also provides the flexibility to expand the number of support rings and corresponding triangular subassemblies to accommodate varying required sizes and lengths of pipe or cable. If a larger carousel is needed, additional concentric support rings are installed outside of any existing support rings. Then additional triangular subassemblies are added until the desired sized carousel is completed. Also, the size of the inner support ring can be varied depending upon the minimum radius of the flexible pipe or cable to be stored on and unspooled from the carousel.

A drive mechanism for rotating the carousel and method of constructing a drive mechanism is provided that includes a motor that rotates a perimeter drive chain. The perimeter drive chain is positioned to engage less than the full circumference of the outer perimeter of the carousel. Sprocket pads are positioned at spaced intervals on the outer perimeter of the carousel and the sprocket pads are configured to engage the profile of the perimeter drive chain.

The perimeter drive chain typically includes a plurality of rows of chain and the sprocket pads include a corresponding number of rows to engage the profile of the perimeter drive chain.

At least one of the sprocket pads is engaged with the perimeter drive chain to rotate the carousel.

The drive mechanism includes a plurality of sprockets that engage the perimeter drive chain comprising at least a pair of perimeter idler sprockets configured to accept the profile of the perimeter drive chain and the perimeter idler sprockets are spaced apart sufficiently far to allow the perimeter drive chain extending between the perimeter idler sprockets to engage a portion of the perimeter and at least one of the sprocket pads on the perimeter of the carousel.

At least one idler sprocket is normally positioned between each perimeter idler sprocket and the drive sprocket, and each of the idler sprockets is adjustable to impose force upon the perimeter drive chain thereby maintaining a desired tension in the perimeter drive chain.

A drive mechanism according to an embodiment of the invention includes the motor connected to a motor sprocket that is connected to a primary drive chain. The primary drive chain is then connected to a primary sprocket of a stacked sprocket assembly. The stacked sprocket assembly includes an integral secondary chain sprocket that engages the perimeter drive chain to rotate the carousel. The primary drive chain may include multiple rows of rollers but does is necessarily the same size or configuration as the perimeter drive chain.

An inner hub design and method of constructing the inner hub design for the rotating carousel assembly is provided that comprises a plurality of vertically oriented fixed plates arranged to form a circle. A plurality of vertically oriented adjustable plates is then moveably connected to the fixed plates. A first set of segments forming a first substantially circular shape is positioned vertically on an outer surface of the adjustable plates. A first substantially circular shape is thereby formed about the outer perimeter of the segments. A plurality of vertically oriented curved plates is positioned about the outer surface of the circular shape of the segments and the curved plates form a substantially uniform circular vertical surface to serve as a center hub of a rotating carousel assembly.

A second set of segments can also be positioned about a lower, outer surface of the moveable plates wherein the second set of segments form a second substantially circular shape that is substantially similar in diameter to the first substantially circular shape, whereby the vertically oriented curved plates have a substantially circular shape upon which to be mounted.

The fixed plates on the inner hub can be embedded in an underlying foundation, such as concrete, asphalt or cement or can be fixed to an underlying fixed platform, constructed of wood or metal or polymer, or the like.

A plurality of horizontally oriented rolling casters is positioned about the substantially uniform circular vertical surface of the curved plates of the hub. The horizontally oriented rolling casters are connected to the rotating carousel assembly whereby at least some of said plurality of horizontally oriented casters engage the substantially uniform circular vertical surface of the curved plates as the rotating carousel rotates.

The novel hub design results in a substantially uniform, vertical, circular shape upon which the horizontal casters of the inventive carousel can rotate. The hub design overcomes the inherent difficulties of attempting to construct a relatively large diameter uniform, vertical circular surface from plate material.

BRIEF DESCRIPTION OF THE DRAWINGS

FIG. 11 is a sectional view taken from line 11-11 of FIG. 10;

FIG. 12 is a partial sectional view taken from FIG. 11;

FIG. 13 is a partial sectional view taken from FIG. 11;

FIG. 16 is an isometric view of the sprocket pad;

FIG. 17 is a top view of a portion of the roller drive chain;

FIG. 18 is an isometric view of a portion of the roller drive chain;

DETAILED DESCRIPTION OF THE INVENTION

Modular Carousel Assembly

Figure 1:
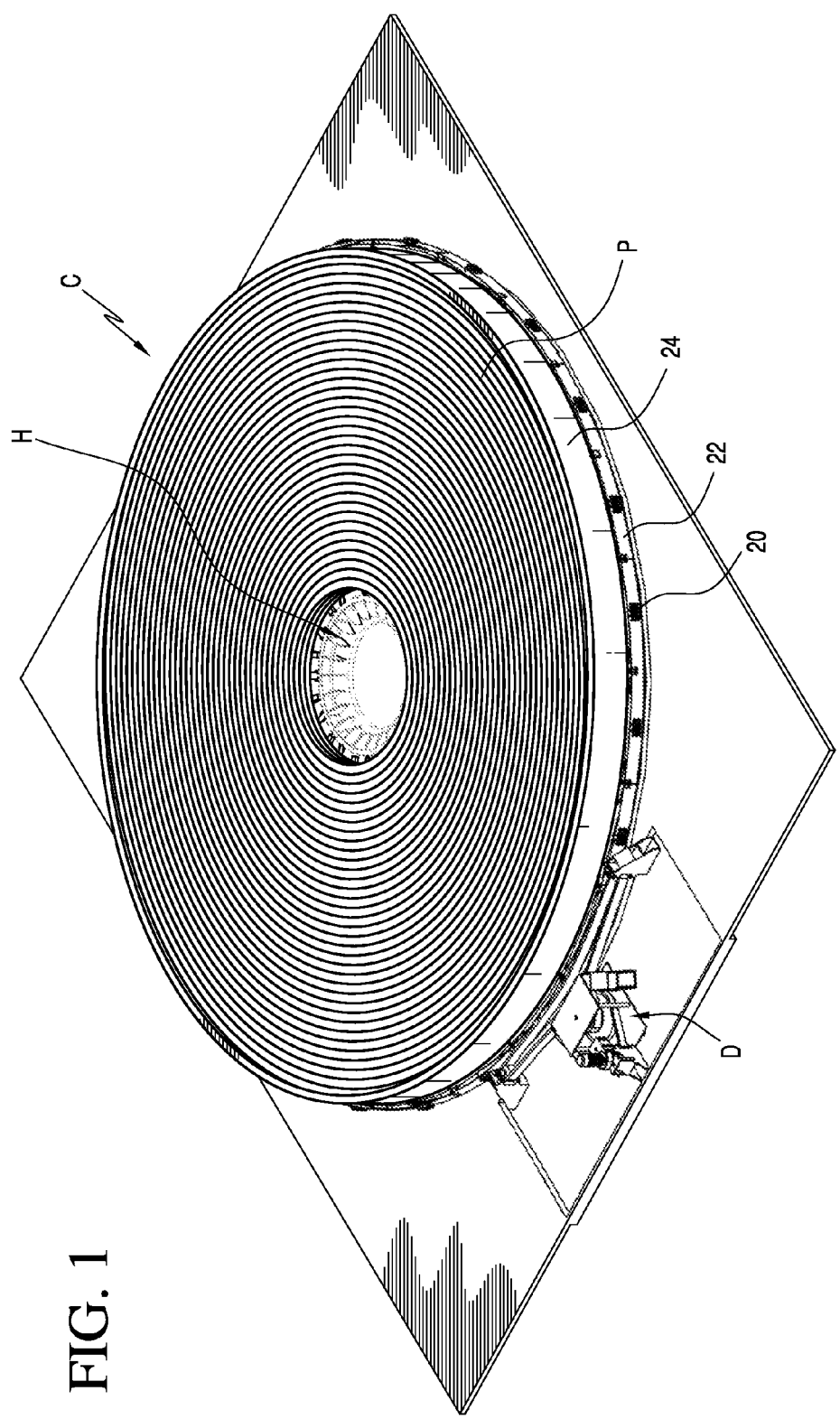
FIG. 1 is an overall isometric view of the inventive carousel, showing pipe wrapped thereon.
Figure 2:
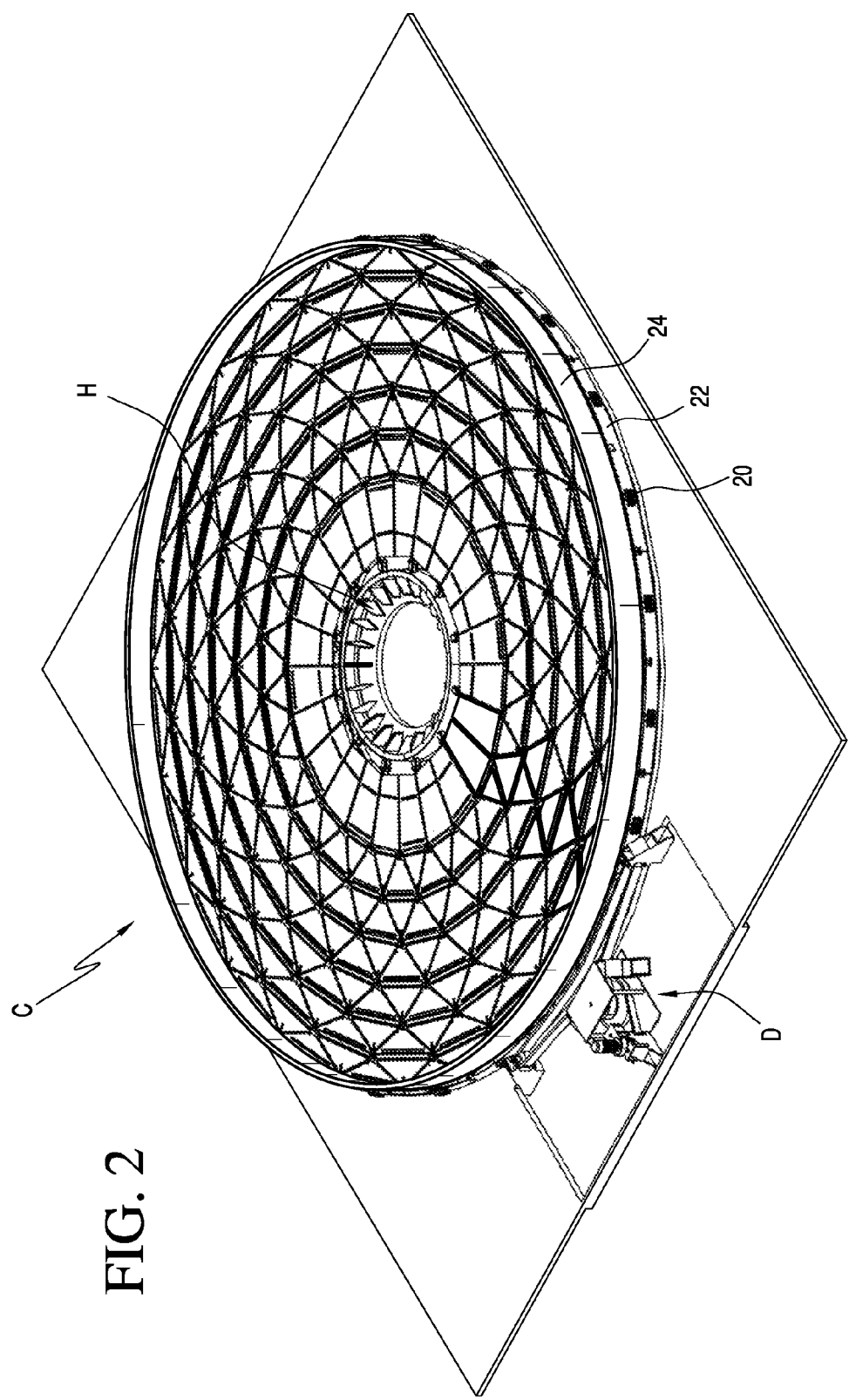
FIG. 2 is an overall isometric view of the inventive carousel, without any pipe or cable wrapped thereon.

The inventive modular carousel C assembly is illustrated isometrically in FIG. 1. The carousel C rotates about the modular hub assembly H and is driven by the tractor drive assembly D. The pipe P that is illustrated on the carousel C is contained on the carousel C with the pipe-retaining ring 24. In FIG. 2, an overview of the carousel C is shown isometrically without any pipe in place.

The modular carousel C assembly includes, but is not limited to, the following parts:

| Element: | Description: |
| --- | --- |
| C | Carousel Assembly |
| D | Tractor Drive Assembly |
| H | Hub Assembly |
| J | Articulating Joint |
| P | Pipe |
| 20 | Sprocket Pad |
| 22 | Outer Perimeter |
| 24 | Pipe-Retaining Ring |
| 25 | Triangular Cover Plate |
| 25a | Trapezoidal Cover Plate |
| 26 | Access Port |
| 28 | Support Surface |
| 30 | Support Ring |
| 30a | Raised Step |
| 32 | Connecting Member |
| 34 | Base Member |
| 34a | Rotation of Base Member |
| 35 | Tangential Support Member |
| 35a | Rotation of Tangential Support Member |
| 40 | Apex Hinge Base |
| 41 | Apex Base |
| 42 | Hinge Plate |
| 44 | Hinge Block |
| 46 | Tangential Hinge Base |
| 48 | Hinge Bolt |
| 50 | Caster |
| 50a | Vertical Movement of Caster |
| 52 | Caster Mount |
| 54 | Caster Mount Base |
| 60 | Roller Drive Chain |
| 62 | Perimeter Sprocket |
| 62a | Perimeter Sprocket Base |
| 64 | Perimeter Drive Chain |
| 64a, 64b, 64c | Roller Chain Rows |
| 65 | Idler Sprocket |
| 65a | Idler Sprocket Support |
| 66 | Chain Roller |
| 66a | Chain Gap |
| 67 | Motor Support |
| 68 | Chain Link |
| 69 | Chain Link Pin |
| 70 | Sprocket Pad |
| 70a, 70b, 70c | Sprocket Pad Rows |
| 72 | Sprocket Tooth |
| 73 | Sprocket Gap |
| 80 | Motor |
| 81 | Motor Sprocket |
| 82 | Primary Drive Chain |
| 83a | Primary Drive Chain Sprocket |
| 83b | Secondary Drive Chain Sprocket |
| 85 | Hub Base |
| 86 | Fixed Plate |
| 86a | Outer Edge of Fixed Plate |
| 88 | Adjustable Plate |
| 89 | Adjustment Slot |
| 89a | Adjustment Bolt/nut |
| 90 | Lower Circular Segments |
| 90a | Lower Step |
| 92 | Upper Circular Segments |
| 92a | Upper Step |
| 94 | Hub Plates |
| 96 | Hub Caster |
| 97 | Hub Caster Base |
| 98 | Hub Caster Support Tube |
| 99 | Hub Inner Support Tube |
| 100 | Inner Caster Support |
| 101 | Hub Support Link |
| 102 | Hub Base |

Articulating Carousel Support Structure

Figure 3:
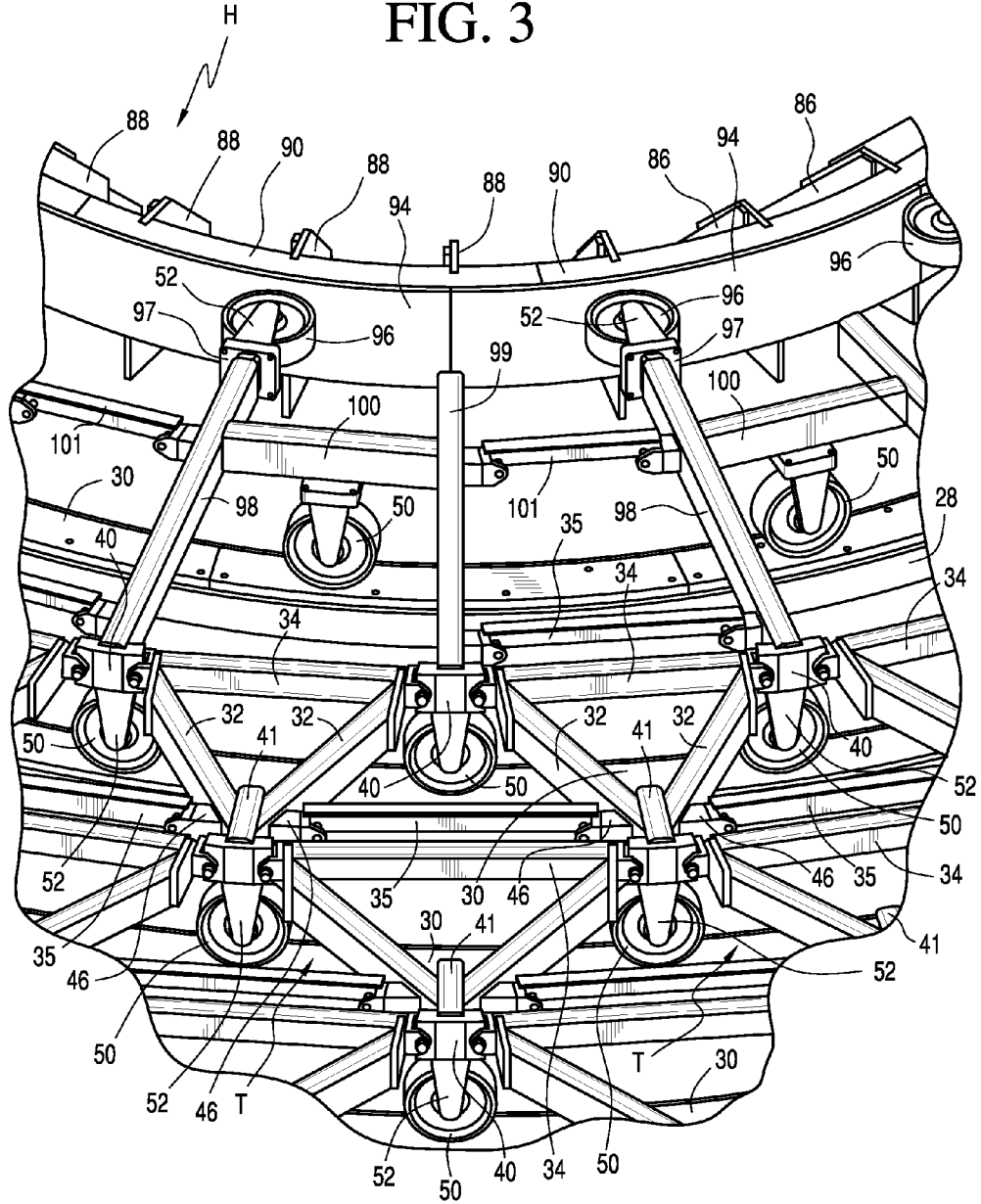
FIG. 3 is a portion of the isometric view of FIG. 2, showing several triangular subassemblies and a portion of the inner hub.

In FIG. 3, a portion of the carousel C and hub assembly H are shown. The carousel C generally includes a series of concentric support rings 30. The number of support rings 30 can vary depending upon the length and size of pipe that is to be stored on the carousel C. The carousel C is assembled by first assembling the hub H (which will be described in more detail in the Modular Hub Assembly section). Referring to FIG. 3, the first support ring 30 is assembled outside of the hub H. The support ring 30 is either mounted directly to the support surface 28 (best seen in FIGS. 11-13) or is mounted on timber or other material between the support surface 28 and the support ring 30. Hub caster 50 support tube 98, together with hub caster 96, which rolls about hub plates 94 are assembled together with alternating hub inner support tubes 99.

Figure 4:
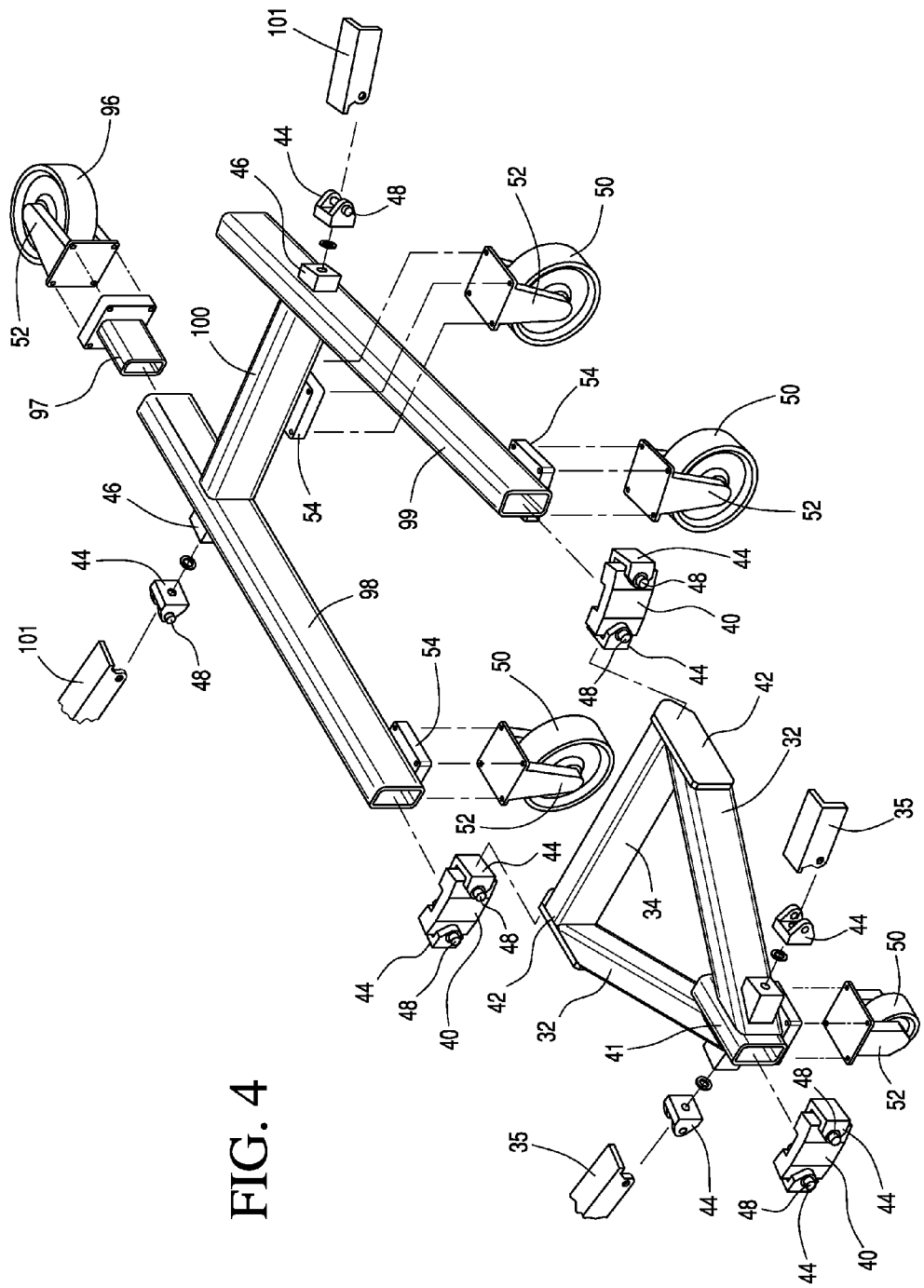
FIG. 4 is an isometric assembly view of a portion of the carousel assembly, including the hub caster and hub caster support tube.

The first circular row of the carousel includes the hub caster support tubes 98 connected to the hub inner support tubes 99 with inner caster supports 100 and hub support links 101. A tangential support member 35 is also typically connected between the outer ends between the hub caster support tubes 98 and the hub inner support tubes 99. A caster is connected beneath each inner caster support 100. The caster support 100 is usually fixed between hub caster support tube 98 and hub inner support tube 99 but may also be rotatably connected. Hub support links 101 are rotatably connected to each hub caster support tube 98 and hub inner support tube 99 as best seen in the assembly view of FIG. 4. The rotatable connection is provided at hinge block 44, which allows the casters 50, which are attached to hub caster supports 100 to move independently, and in particular, in a vertical direction. The casters 50 are able to move up and down, even when the surface of the support ring 30 is uneven due to uneven support surface 28 upon which the support ring 30 is located. The casters 50 that are connected to the inner caster supports 100 roll on the innermost support ring 30. Additional casters 50 are connected to caster mounts 52, which are connected to caster mount bases 54 and are positioned at each outer end of the hub caster support tube 98 and the hub inner support tube 99, best seen in FIG. 4.

It is possible that no support rings 30 would be used if the carousel C is installed on a surface that is sufficiently durable to withstand the rolling stresses from the casters 50.

Referring now to FIGS. 3-13, the carousel C is built up from the inside working outward by adding triangular subassemblies T. Triangular subassemblies T include base member 34, which is connected to two connecting members 32. The two connecting members 32 are typically equal in length, thereby forming an isosceles triangle and are joined at an apex base 41.

The first set of triangular subassemblies T are assembled above the second concentric support ring 30 and are attached to the apex hinge bases 40, which are attached to the ends of the hub inner support tube 98 and the hub inner support tube 99, as best seen in FIG. 3. Tangential support members 35 are pivotally connected between the triangular subassemblies T to tangential hinge bases 46. The tangential support members 35 provide lateral support to the apex base 41 ends of the triangular subassemblies T. The tangential support members 35 rotate about hinge bolts 48 to provide vertical movement to the casters 50 to allow the casters 50 to move up and down to stay in contact with the support ring 30, thereby transferring the load from the carousel C to the casters 50 and then to the support ring 30.

Figure 5:
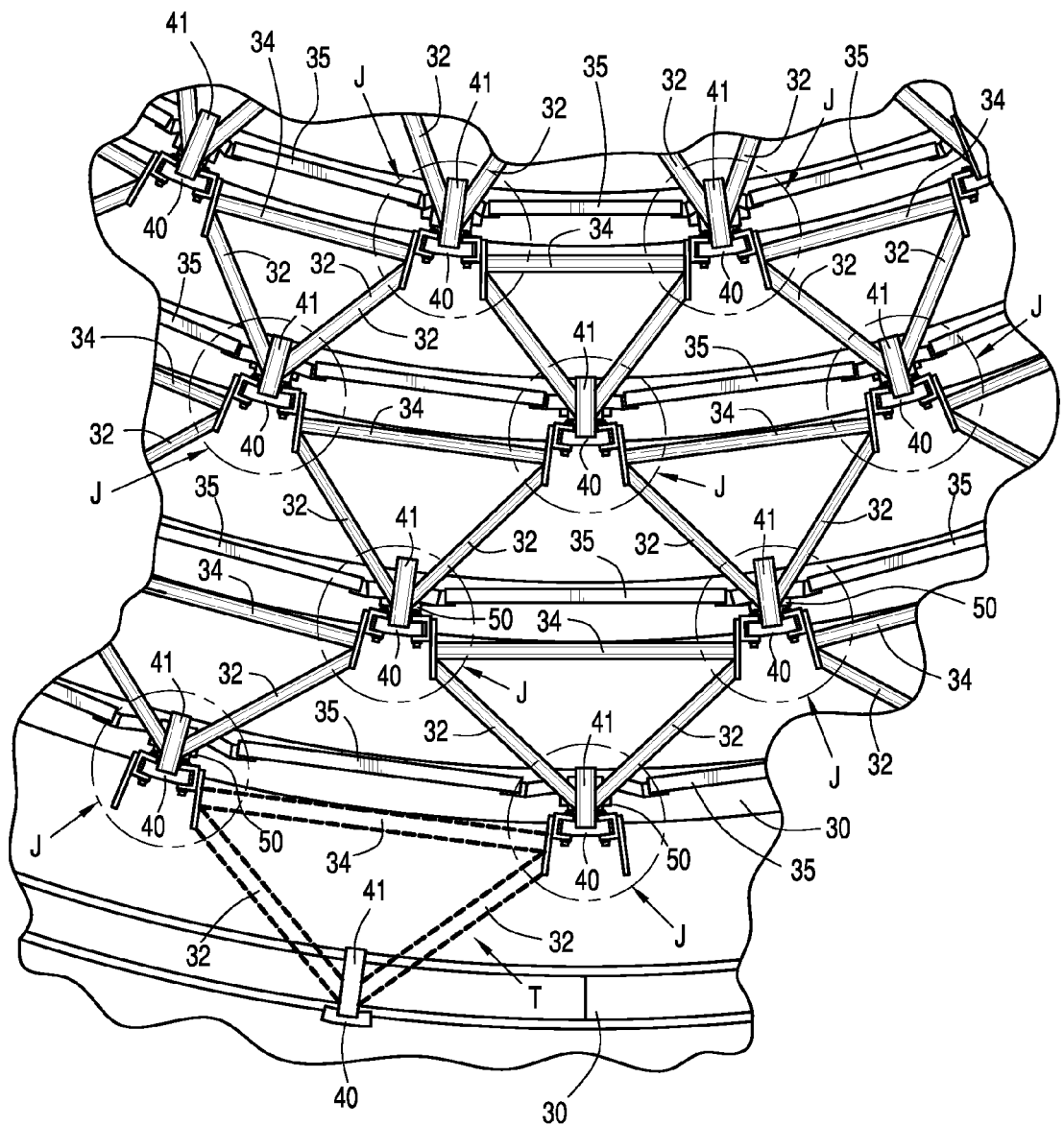
FIG. 5 is a portion of the isometric view of FIG. 2 showing the triangular subassemblies and articulating joints.
Figure 6:
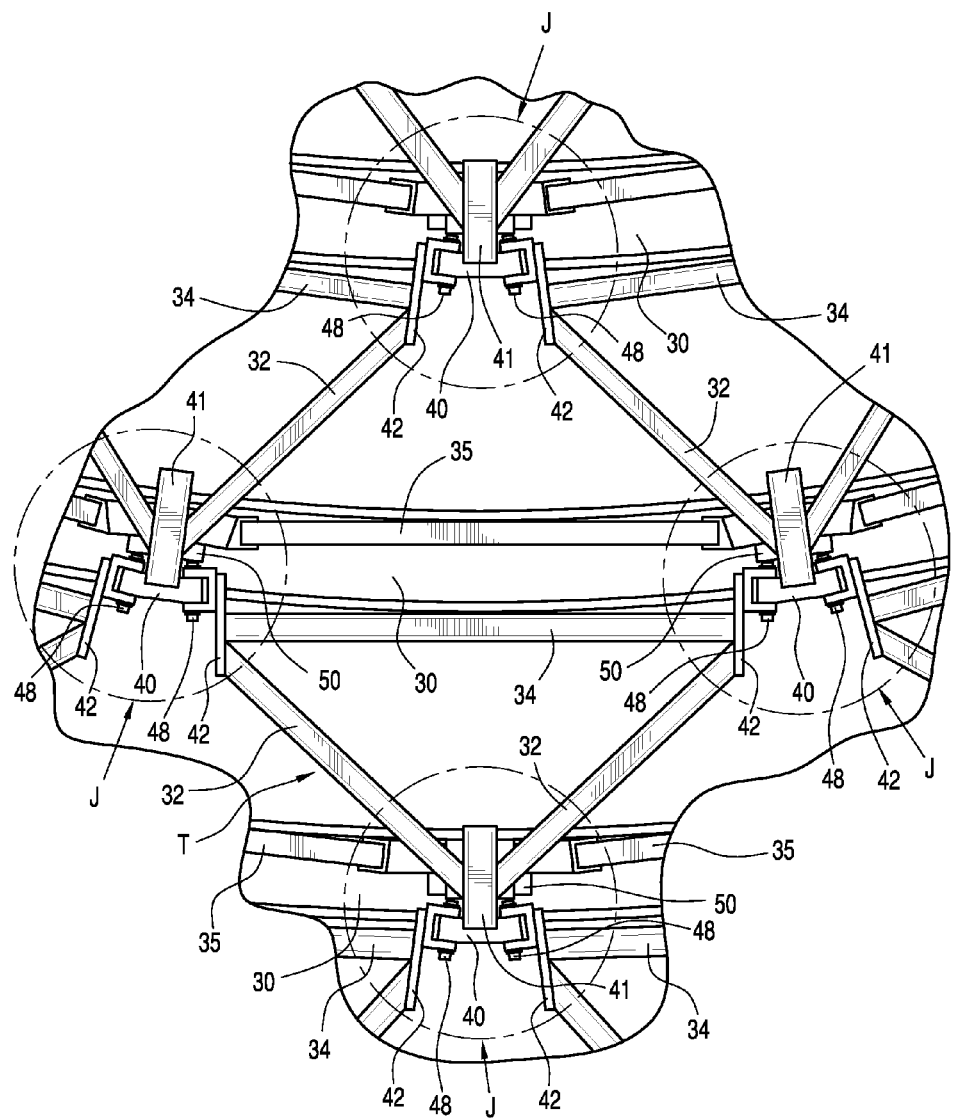
FIG. 6 is an enlarged portion of FIG. 5 showing the triangular subassemblies and articulating joints.

The construction of the carousel C continues by placing additional support rings 30 outside of the existing outer support ring 30, then assembling additional triangular subassemblies T, as explained above. FIG. 5 shows an outermost support ring 30 and a first assembled triangular subassembly T (shown in dashed lines). FIG. 6 shows a detail of the triangular subassembly T after it has been assembled to the existing apex hinge bases 40.

Figure 7:
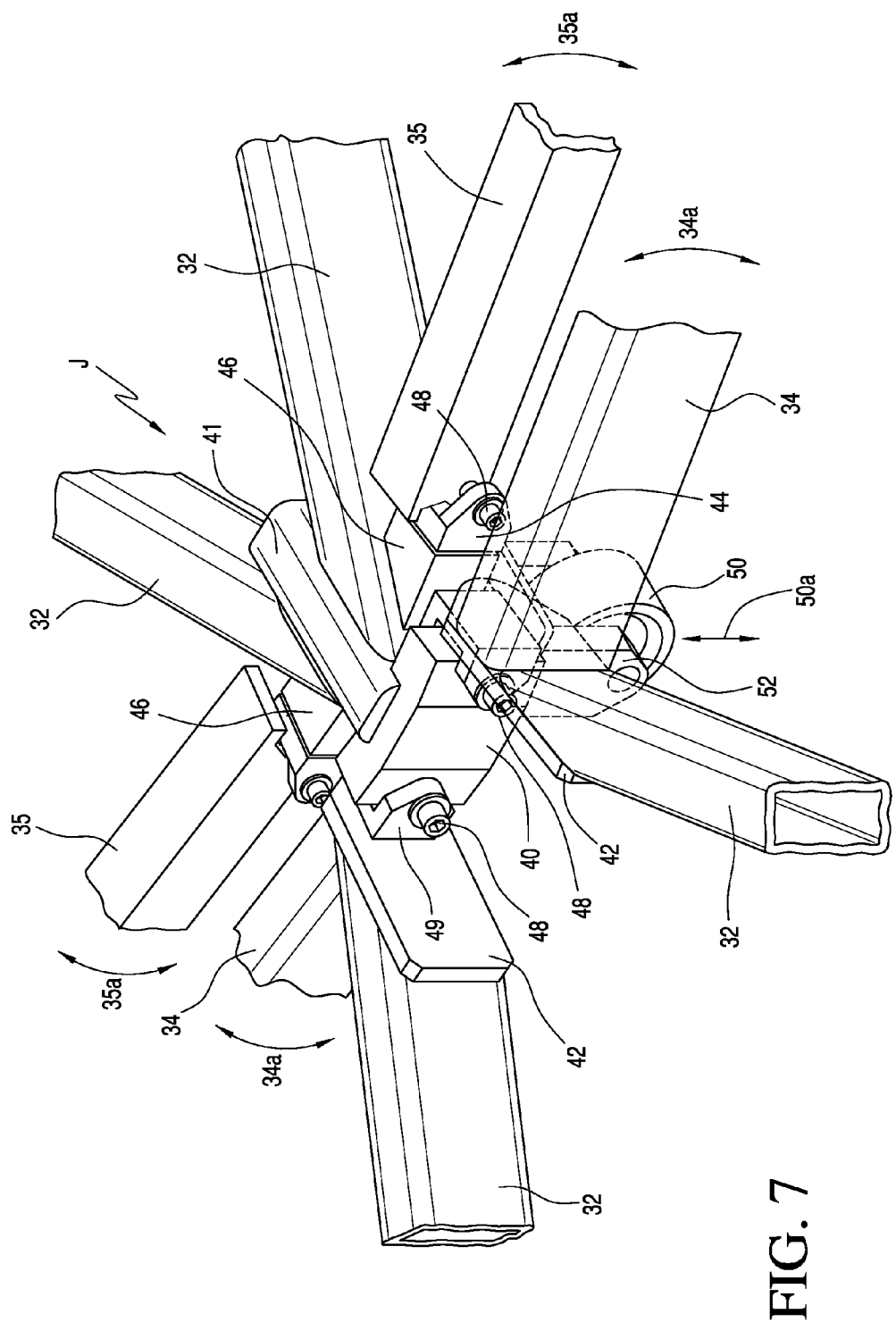
FIG. 7 is a detailed isometric view of an articulating joint of the invention.
Figure 8:
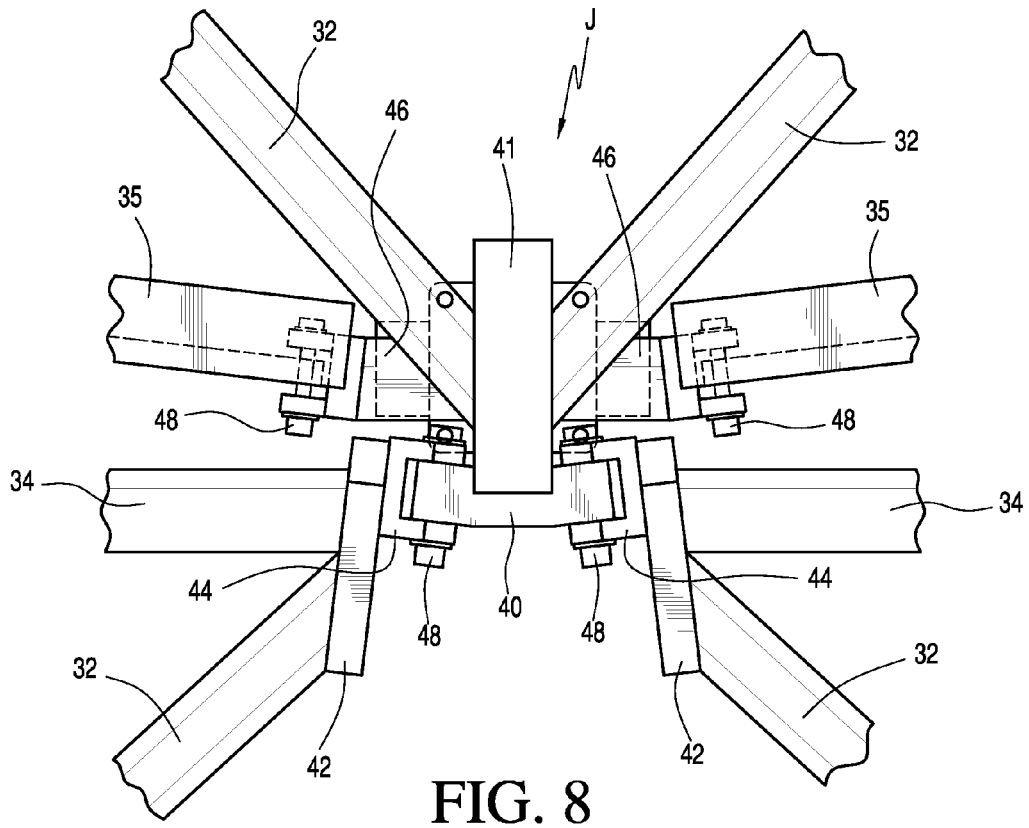
FIG. 8 is a detailed top view of an articulating joint of the invention.
Figure 9:
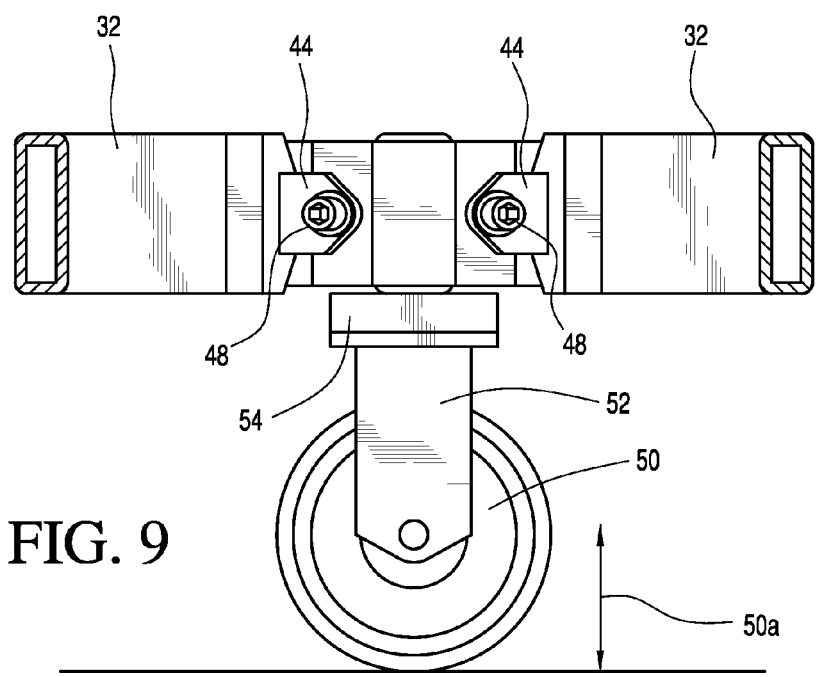
FIG. 9 is a front view of the articulating joint of FIG. 8.

The detail of the articulating joint J of the carousel C is shown in FIGS. 7-9. Tangential support members 35 rotate about hinge bolts 48 and the rotational direction is indicated by the rotational arrow 35a. Similarly, base members 34 rotate about hinge bolts 48 as indicated by the rotational arrow 34a. The rotational movements of tangential support members 35 and base members 34 are determined by the vertical movement of the casters 50, as indicated by the vertical directional arrow 50a, shown in FIGS. 7 and 9. The articulating joints J allow the individual casters 50 to move vertically to allow for an uneven support surface 28 and/or an uneven support ring 30. As many sets of additional triangular subassemblies T can be added as desired, based on the desired pipe capacity of the carousel C. As each additional row of triangular subassemblies T is added, another series of articulating joints J is provided above the underlying support ring 30, as best seen in FIGS. 11-13.

Figure 10:
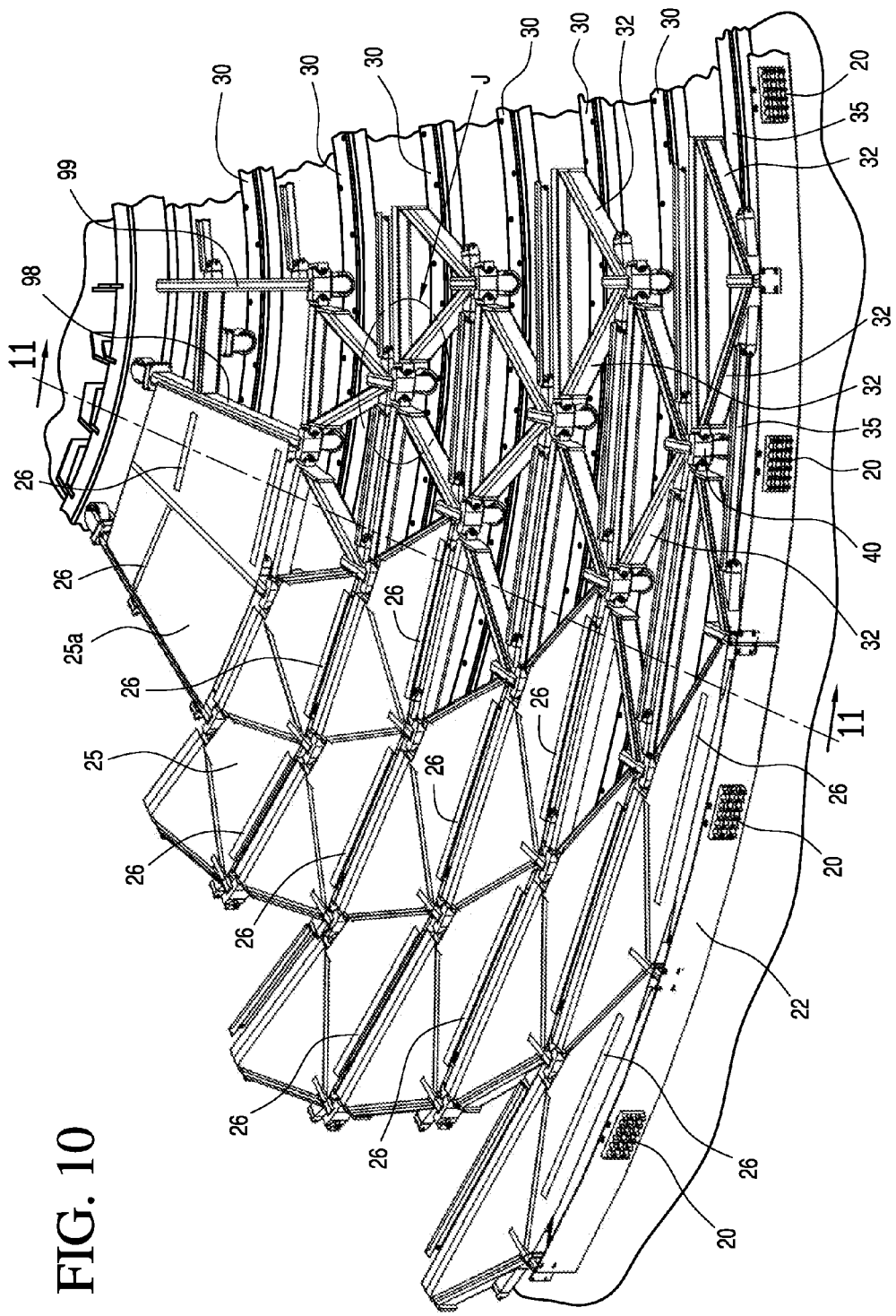
FIG. 10 is a partial isometric view of the carousel of FIG. 2, including covering plates of a portion of the carousel structure.

FIG. 10 shows an isometric view of a portion of the carousel C of FIG. 1. In FIG. 10, covering plates 25 and 25a are shown covering the structure of the carousel C. The triangular cover plates 25 cover the triangular subassemblies T and the trapezoidal cover plates 25a cover the areas formed between the hub caster support tubes 98 and hub inner support tubes 99. Access ports 26 are provided for purposes of assembly and inspection.

FIG. 11 shows a cross section of the carousel C including seven (7) concentric support rings 30 on a support surface 28. The support rings may be raised above the support surface 28 with the raised steps 30a. More or less than seven (7) concentric support rings 30 can be provided, depending upon how large of a carousel C is desired. When the final number of support rings 30 is assembled and the corresponding triangular subassemblies T are assembled about the outer support ring 30, the triangular assemblies T are normally connected together with tangential support members 35, for example, as shown in FIGS. 10, 11 and 13. An outer perimeter 22 is attached to the outer apex hinge bases 40. The outer perimeter 22 comprises a series of curved plates that conform to the circumferential shape of the outer perimeter 22 of the carousel, best seen in FIG. 10. Also shown on the outer perimeter 22 in FIG. 10 are sprocket pads 20, which will be discussed as they relate to the tractor drive assembly D.

After the desired number of concentric support rings 30, corresponding triangular subassemblies T and outer perimeter 22 have been assembled, triangular cover plates 25 are assembled to cover the triangular subassemblies and trapezoidal cover plates 25a are assembled to cover the open trapezoids formed between the hub caster support tube 98 and the hub inner support tube 99, as shown in FIG. 10. The cover plates 25 and 25a are removable to allow access to the structures of the carousel C, and help to prevent debris from fouling the casters 50, the supporting rings 30, the articulating joints J and the interconnected structures of the carousel C generally.

Tractor Drive Assembly

The tractor drive assembly D is shown in the overview of FIGS. 1 and 2 and in detail in FIGS. 14-18. The tractor drive assembly D includes a perimeter drive chain 64 that typically includes multiple rows 64a, 64b, 64c of rollers as shown in FIG. 18. Drive chain motor 80 drives motor sprocket 81 that turns primary drive chain 82. Primary drive chain 82 rotates primary drive chain sprocket 83a. Primary drive chain sprocket 83a is part of a stacked sprocket that includes integral secondary roller chain sprocket 83b. Secondary drive chain sprocket 83b rotates the perimeter drive chain 64. Perimeter sprockets 62 engage the perimeter roller drive chain 64 and space the perimeter drive chain 64 apart such that the perimeter drive chain 64 contacts the outer perimeter 22 of the carousel C. The drive motor 80 may also be coupled directly to the primary drive chain sprocket 83a or to the secondary drive chain sprocket if alternate gearing of the sprocket size is not desired. The larger the diameter of the primary drive chain sprocket 83a, the greater the torque will be transferred to the secondary drive chain sprocket 83b from the drive chain motor 80.

The following estimates have been made for the motor size for different carousel sizes and pipe speeds:

|  | Carousel Outer Diameter/Hub Diameter/Pipe Speed | | | |
| --- | --- | --- | --- | --- |
|  | 75 feet/ 20 feet at 10 feet/min | 75 feet/ 20 feet at 20 feet/min | 60 feet/ 20 feet at 10 feet/min | 60 feet/ 20 feet at 20 feet/min |
| Motor Size (HP) | 40 | 80 | 20 | 40 |

The calculations are estimated and will also depend upon the weight of the pipe and carousel and other factors.

The perimeter sprockets 62 are positioned sufficiently far apart so that the span of the perimeter drive chain 64 between them engages the outer perimeter 22 of the carousel C. The position of the perimeter sprocket bases 62a can be changed to adjust the position of the perimeter sprockets 62. Idler sprockets 65 engage the outside of the perimeter drive chain 64 on opposite sides of the secondary roller drive chain sprocket 83b. The position of the idler sprocket bases 65a can be changed to adjust the tension of the perimeter drive chain 64.

Figure 14:
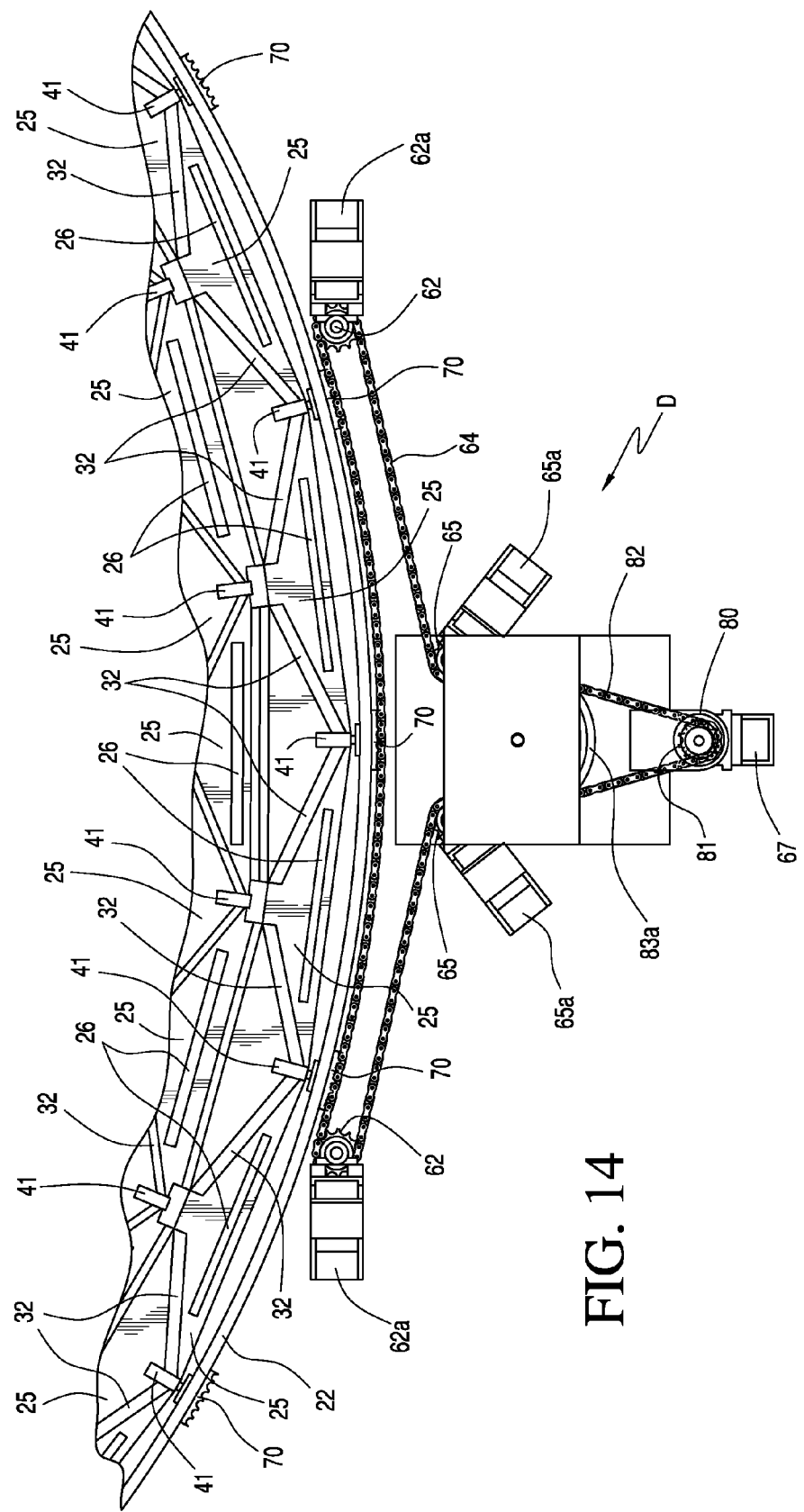
FIG. 14 is a top view of the tractor drive assembly and a portion of the carousel.
Figure 15:
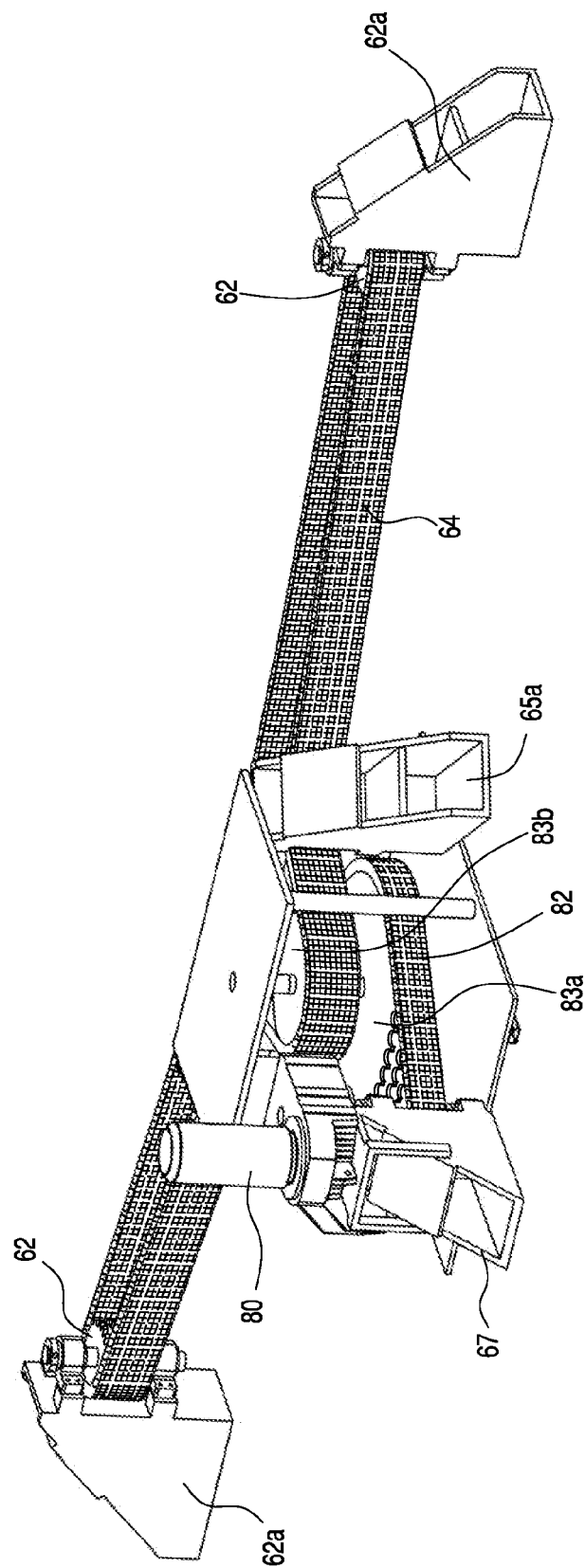
FIG. 15 is an isometric view of the tractor drive assembly.

FIG. 16 shows the sprocket pad 70 used with the tractor drive assembly T. The sprocket pad 70 has a profile of teeth 72 and grooves 73 that correspond to the rollers 66 and gaps 66a of the perimeter drive chain 64. Multiple rows 70a, 70b, 70c of teeth 72 and grooves 73 are provided on the sprocket pads 70 to correspond to the multiple rows 64a, 64b, 64c of the perimeter drive chain 64. Multiple sprocket pads 70 are positioned about the outer perimeter 22 of the carousel C. The sprocket pads 70 may be connected to the outer perimeter 22 in any conventional manner, such as welding or bolting. The perimeter drive chain 64 engages the sprocket pads 70 as shown in FIG. 14. The sprocket pads 70 are spaced apart such that the roller drive chain is in contact with at least a minimum desired number of sprocket pads 70. The number of sprocket pads 70 in contact with the roller drive chain 64 is shown in the drawings to be three (3), but the number of sprocket pads 70 in contact with the roller drive chain 64 can vary depending upon the amount of torque that is to be transferred by the perimeter drive chain 64 to the sprocket pads 70 and carousel C, as will be understood by a person skilled in the art.

Although the primary drive chain 82 and perimeter drive chain 64 are typically similar in construction, and typically have the same number of rows 64a, 64b, 64c, it is contemplated that different numbers of rows may be included on the primary drive chain 82 than on the perimeter drive chain 64.

The stacked sprocket, comprising the primary sprocket 83a and the secondary sprocket 83b will have the same number of rows of sprocket teeth 70a, 70b, 70c that corresponds to the number of rows of rollers 64a, 64b, 64c on the corresponding primary drive chain 82 and perimeter drive chain 64.

Use of sprocket pads 70 in combination with the perimeter drive chain 64 offers significant advantages over the use of a drive chain or belt around the entire outer perimeter 22 of the carousel C.

First, the perimeter drive chain 64 is expensive. The length of perimeter drive chain 64, and hence the cost, is significantly reduced by driving the spaced sprocket pads 70 instead encircling the entire outer perimeter 22 of the carousel C with a full length drive chain.

Second, perimeter drive chain 64 is heavy. By using a shorter overall length of perimeter drive chain 64, the handling of a full circumference chain can be avoided. Heavy chain wrapped around the full circumference of a carousel can fail because it tends to sag and/or stretch, either of which are undesirable.

Third, a full circumference gear generally accompanies a full circumference chain. The full circumference gear is both expensive and unwieldy. The use of sprocket pads 70 is both efficient and inexpensive relative to the conventional full circumference approaches to turning carousels.

Modular Hub Assembly

Figure 19:
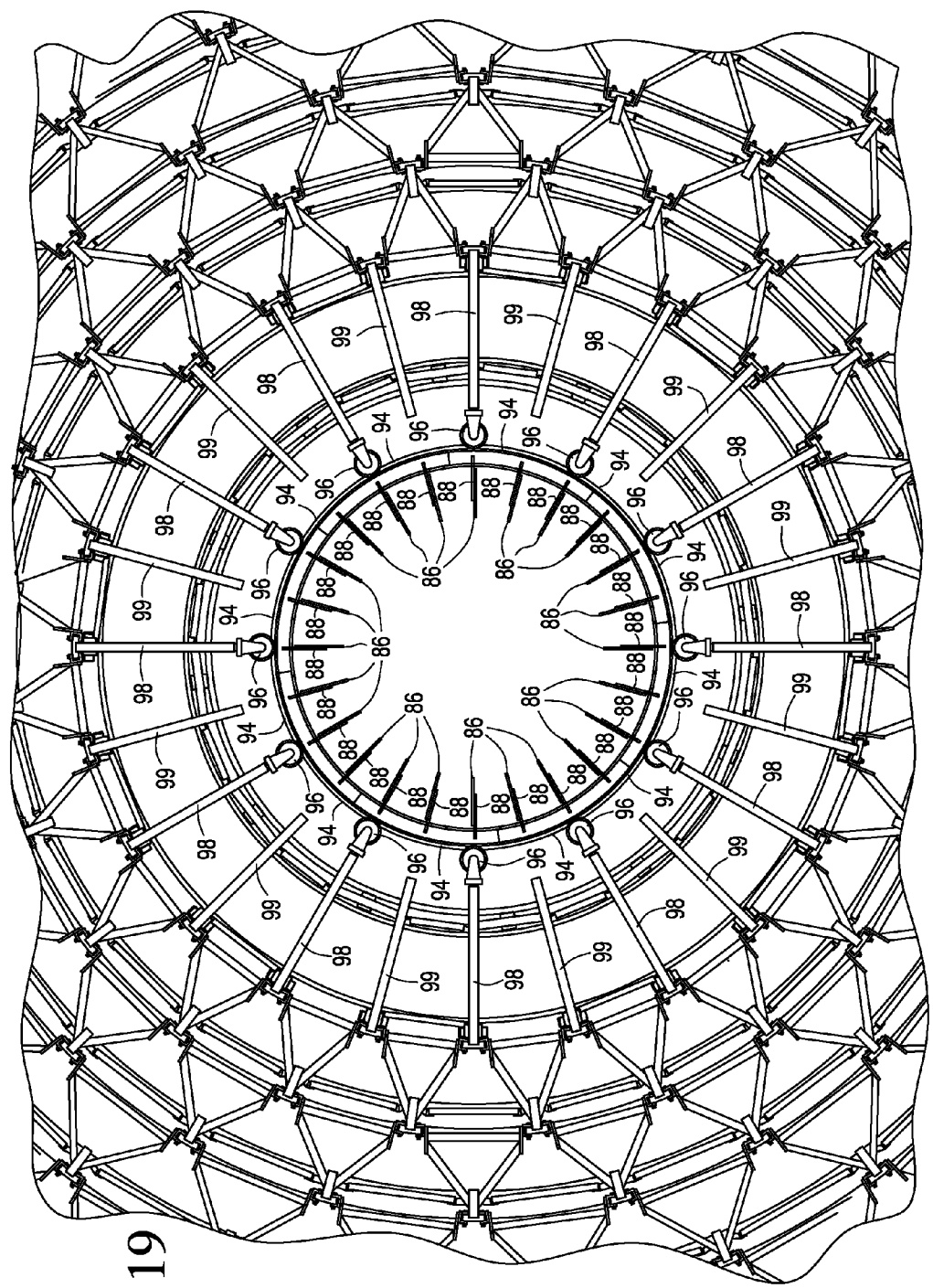
FIG. 19 is a top view of the hub including a portion of the carousel.
Figure 20:
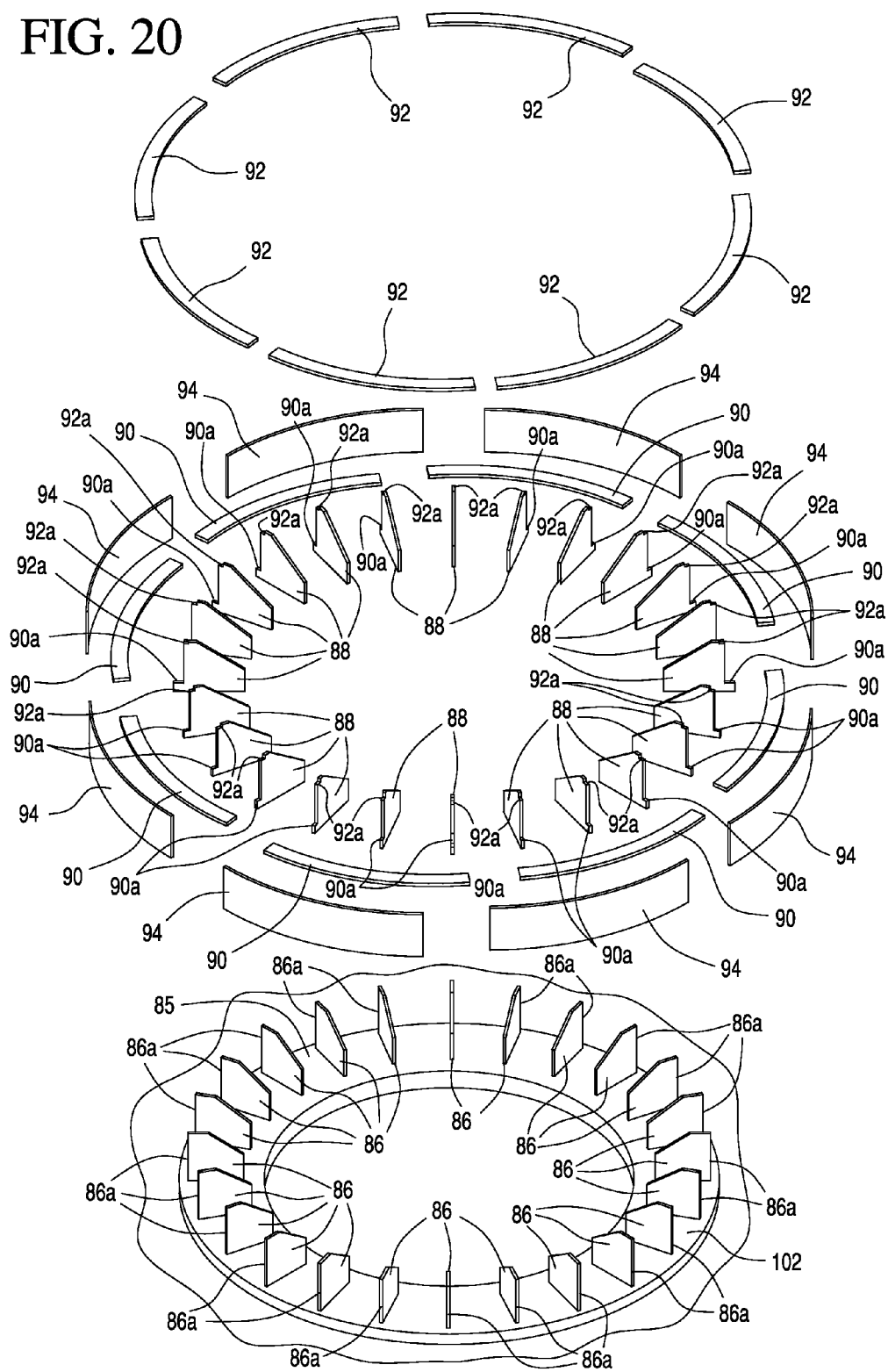
FIG. 20 is an isometric assembly view of the hub assembly.

Refer to FIGS. 19-22 for details concerning the modular hub assembly H. A top view of the fully assembled hub H and a portion of the carousel C are shown in FIG. 19. An isometric assembly view of the modular hub assembly H is shown in FIG. 20. A hub base 102 is constructed from concrete or other suitable base material, for example by setting forms and pouring concrete between the forms. Alternative material and forms may also be used to provide a solid base for the hub assembly H. The hub base 102 is shown as a donut shape in FIGS. 21 and 22, but it may be a solid circular shape and need not necessarily be raised.

It is important for the elevation of the horizontal casters 96 to correspond to the hub plates 94, so that the horizontal casters roll about the hub plates 94. Therefore, consideration is given during construction of the carousel C and the modular hub assembly H to the elevation of the support rings 30 relative to the hub base 102 (Refer also to FIG. 12).

Figure 21:
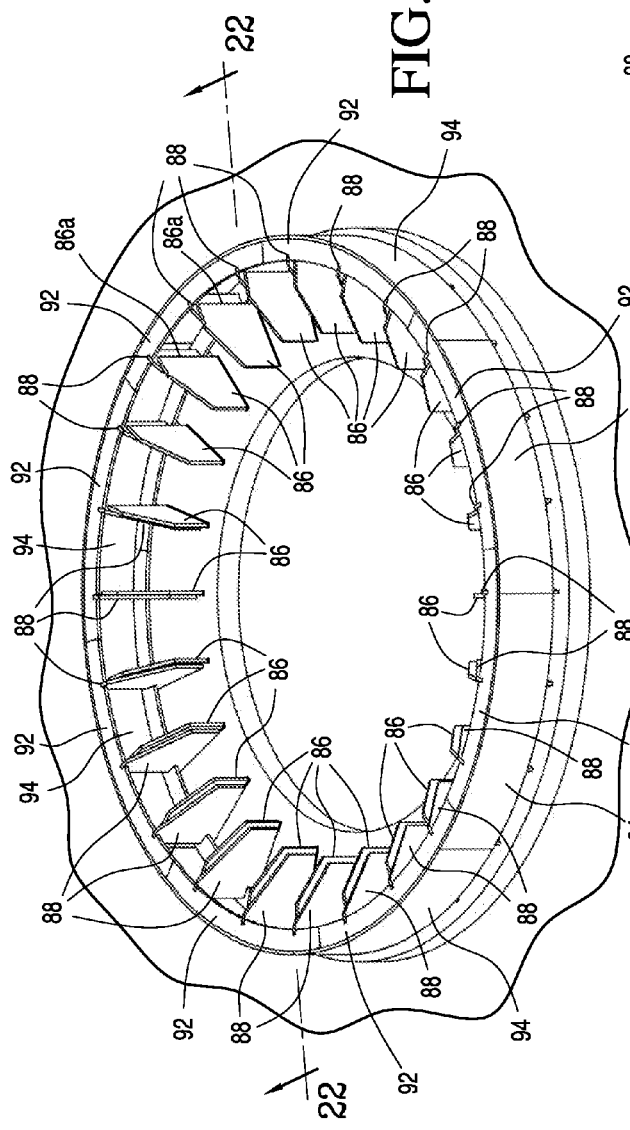
FIG. 21 is an isometric view of the assembled hub.
Figure 21A:
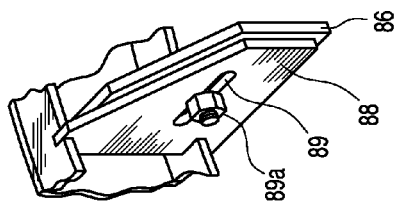
FIG. 21a is an isometric partial view showing an alternative embodiment of the fixed and adjustable plates.
Figure 22:
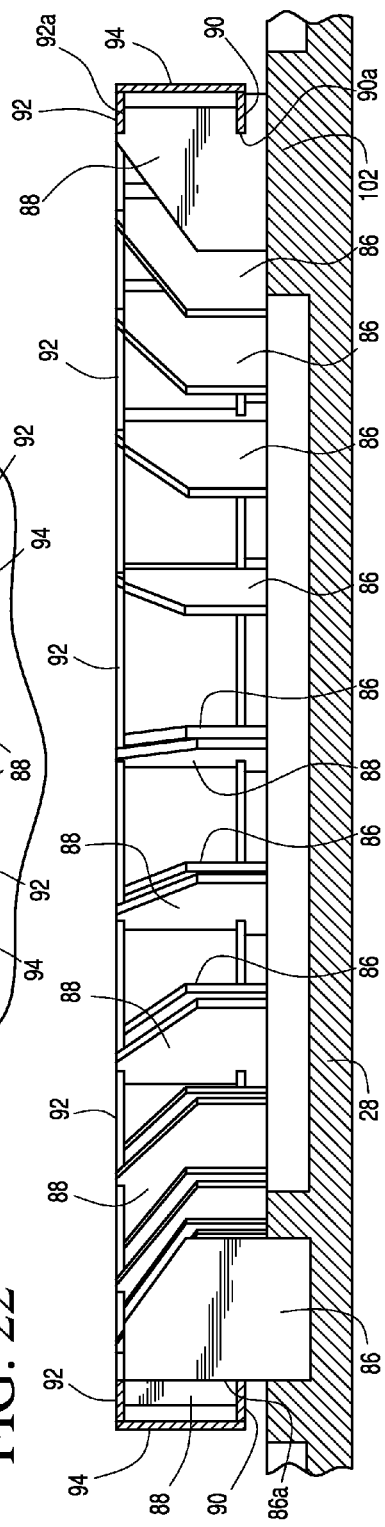
FIG. 22 is a section view of the hub assembly taken from line 22-22 of FIG. 21.

The fixed plates 86 are positioned in the hub base 102, while the hub base is still soft enough for the fixed plates 86 to be inserted into the hub base 102 material. In other words, the fixed plates 86 are inserted into the hub base material 102 while it is still in the formative state, and before the hub base 102 material solidifies. The fixed plates 86 are arranged such that the outer edge 86a of each plate faces outward from the center of the hub base 102 to generally form a circle along the outer edge 86a of each fixed plate 86, as best seen in the lowermost portion of FIG. 20. The diameter of the hub assembly H is typically 20 feet or more, but may also be smaller. Because of the possible large diameter of the hub assembly H, it is very difficult to obtain a true, uniform circle about the outer edges 86a of the fixed plates 86. Therefore, adjustable plates 88 are temporarily attached to each of the fixed plates 86 with clamps or other connecting mechanisms. The lower circular segments 90 are assembled about the adjustable plates 88 by positioning and welding or otherwise securing the lower circular segments 90 on the lower steps 90a of the adjustable plates 88. The lower circular segments 90 can be cut or machined to a close tolerance to produce a very uniform circular shape about the outer edge of the assembled lower circular segments 90. After the lower circular segments 90 have been assembled about the adjustable plates 88, the adjustable plates are secured to the fixed plates 86 by either welding or by securing nuts/bolts 89a in adjustment slots 89 to secure the adjustable plates 88 to the fixed plates 86 together (See FIG. 21a for a detail of the adjustment slots 89 embodiment). Alternative connections such as clamps may also be used to secure the adjustable plates 88 to the fixed plates 86.

The upper circular segments 92 are assembled about the adjustable plates 88 by positioning and welding or otherwise securing the upper circular segments 92 on the upper steps 92a of the adjustable plates 88. As with the lower circular segments 90, the upper circular segments 90 can be also cut or machined to a close tolerance to produce a very uniform circular shape about the outer edge of the assembled upper circular segments 92.

The assembled lower circular segments 90 and upper circular assembly 92 provides a very uniform, circular surface on which to assemble the hub plates 94. The hub plates 94 are bent or otherwise formed to the same shape as the shape of the outer edges of the lower circular segments 90 and upper circular segments 92. The hub plates 94 are then typically welded together and to the lower circular segments 90 and upper circular segments 92, but they may also be secured with bolts or other fastening means.

It is contemplated that a single set of circular segments, having a uniform shape about the outer edge of the assembled circular segments may also be used instead of a set of upper circular segments 92 and a set of lower circular segments 90. Also, more than two sets of circular segments may also be provided, as desired.

The resulting uniform, circular surface of the hub plates 94 provides an ideal surface to serve as the hub assembly H on which the hub casters 96 rotate, as best seen in FIG. 19. It is possible that not all hub casters 96 will engage the surface of the hub plates 94, but the uniform surface maximizes the number of hub casters 96 that can engage the surface of the hub plates 94 at any time. It is important for as many hub casters 96 to be in contact with the hub plates 94 in order to distribute the load across as many hub casters 96 as possible. If too few hub casters 96 were to bear the load of the rotating carousel C, failure of the hub casters 96 could occur. Also, the uniform hub surface about the hub plates 94 results in a smooth movement of the hub casters 96 to prevent the casters from vibrating, bending or from suffering other undesirable stresses.

The foregoing disclosure and description of the invention are illustrative and explanatory thereof, and various changes in the size, shape, and materials, as well as in the details of the illustrated construction may be made without departing from the spirit or scope of the invention.

What is claimed is:

1. A modular rotating carousel assembly for storage and unspooling of pipe or cable comprising:
   a. a plurality of concentric support rings;
   b. a plurality of triangular subassemblies; each triangular subassembly comprises a base member and at least one pair of connecting members;
   c. each of said base members being oriented substantially tangentially to the support ring above which it is positioned; and each of said connecting members being connected at one end to said base member and connected at the other end to the other said connecting member to form an apex; said apex is oriented outwardly from the center of said concentric support rings; said triangular subassemblies being rotatably interconnected at said base members about the circumference of said support rings whereby said base members form an articulating substantially circular ring above each support ring above which each base member is positioned.

2. A modular rotating carousel according to claim 1 wherein the base members of additional triangular subassemblies are rotatably interconnected to said apex of said connecting members of existing triangular subassemblies whereby said interconnected base members form an additional articulating substantially circular ring above the support ring above which each base member is positioned.

3. A modular rotating carousel according to claim 2 wherein tangential support members are rotatably connected between said apexes of said triangular subassemblies; said tangential support members are positioned substantially tangential to the support ring above which each said tangential support member is positioned and whereby said tangential support members provide movement in the vertical direction and provide lateral support to said triangular subassemblies.

4. A modular rotating carousel assembly according to claim 2 wherein the number of and diameter of support rings and corresponding interconnected triangular subassemblies is selected to form the surface area necessary to store the desired volume of pipe on the rotating carousel assembly.

5. A modular rotating carousel assembly according to claim 2 wherein the length of said base members becomes longer as the diameter of the support ring above which each base member is located becomes larger, whereby the number of triangular subassemblies interconnected about the perimeter of each support ring remains constant.

6. A modular rotating carousel according to claim 1 wherein a rolling caster is positioned below the triangular subassembly interconnections at each of three outer points on said triangular subassembly to support the triangular subassemblies and to allow said triangular subassemblies and the carousel to rotate about the plurality of said concentric support rings.

7. A modular rotating carousel assembly according to claim 1 wherein an inner hub is positioned inside of an innermost support ring; said hub having a substantially circular, vertical surface forming a bearing surface upon which horizontally oriented casters, which are interconnected to the substantially circular ring formed by innermost triangular subassembly base members; whereby innermost substantially circular ring and each substantially circular ring outside of said interconnected triangular subassemblies rotate about said bearing surface of said inner hub.

8. A modular rotating carousel assembly according to claim 7 wherein the radius of said inner hub is selected according to the desired minimum bend radius of the pipe to be stored or unspoolled from said carousel assembly.

9. A modular rotating carousel assembly according to claim 1 wherein a drive mechanism is connected to the carousel assembly to rotate the carousel at a desired rotational speed.

10. A modular rotating carousel assembly according to claim 1 wherein said connecting members are substantially equal in length whereby said triangular subassemblies form isosceles triangles.

11. A modular rotating carousel assembly for storage and unspooling of pipe or cable comprising:
   a. a plurality of triangular subassemblies; each triangular subassembly comprises a base member and at least one pair of connecting members;

b. said at least one pair of connecting members being connected together at one end to form an apex and being connected at the other end to said base member;

c. said base members of said plurality of triangular subassemblies being rotatably connected together to form a first circle; wherein said apexes of said connecting members extend outwardly from said first circle; and d. a plurality of rotating caster members being positioned beneath the rotatable connection of a plurality of said base members.

12. A modular rotating carousel assembly according to claim 11 wherein an additional circle is formed from a plurality of base members of said triangular subassemblies that are rotatably connected to said apexes of the rotatably connected triangular subassemblies of said first circle.

13. A modular rotating carousel assembly according to claim 12 wherein a circular support ring is positioned beneath said rotating casters to support said casters.

14. A modular rotating carousel according to claim 13 wherein a plurality of said circular support rings is raised above an underlying support structure to elevate said first and additional circles.

15. A modular rotating carousel assembly according to claim 12 wherein the rotatable connection formed at the apexes of rotatably connected subassemblies forms an articulating joint that allows vertical movement of said joint and of each said circle.

16. A modular rotating carousel according to claim 12 wherein subsequent additional circles are formed by connecting base members of triangular subassemblies to existing apexes of existing circles until the desired carousel diameter is formed.

17. A method of constructing a modular rotating carousel assembly for storing and unspooling flexible pipe comprising the steps of:

a. assembling a plurality of triangular subassemblies comprising a base member and at least one pair of connecting members;

b. connecting said at least one pair of connecting members at one end to form an apex;

c. connecting the other end of said connecting members to said base member;

d. rotatably connecting said base members of said plurality of triangular subassemblies together to form a first circle;

e. extending said apexes of said connecting members outwardly from said first circle; and f. positioning a plurality of rotating caster members beneath the rotatable connection of a plurality of said base members.

18. A method of constructing a modular rotating carousel assembly for storing and unspooling flexible pipe according to claim 17 comprising the additional step of forming an additional circle from a plurality of base members of said triangular subassemblies that are rotatably connected to said apexes of the rotatably connected triangular subassemblies of said first circle.

19. A method of constructing a modular rotating carousel assembly for storing and unspooling flexible pipe according to claim 17 comprising the additional steps of:

a. positioning a substantially circular inner hub inside the circumference of an innermost support ring;

b. forming a substantially vertical bearing surface about the outer perimeter of said inner hub;

c. interconnecting horizontally oriented casters to the substantially circular ring formed by said innermost triangular subassembly base members; whereby innermost substantially circular ring and each rotating ring outside of said interconnected triangular subassemblies rotate about said bearing surface of said inner hub.

* * * * *